Patented Apr. 11, 1950

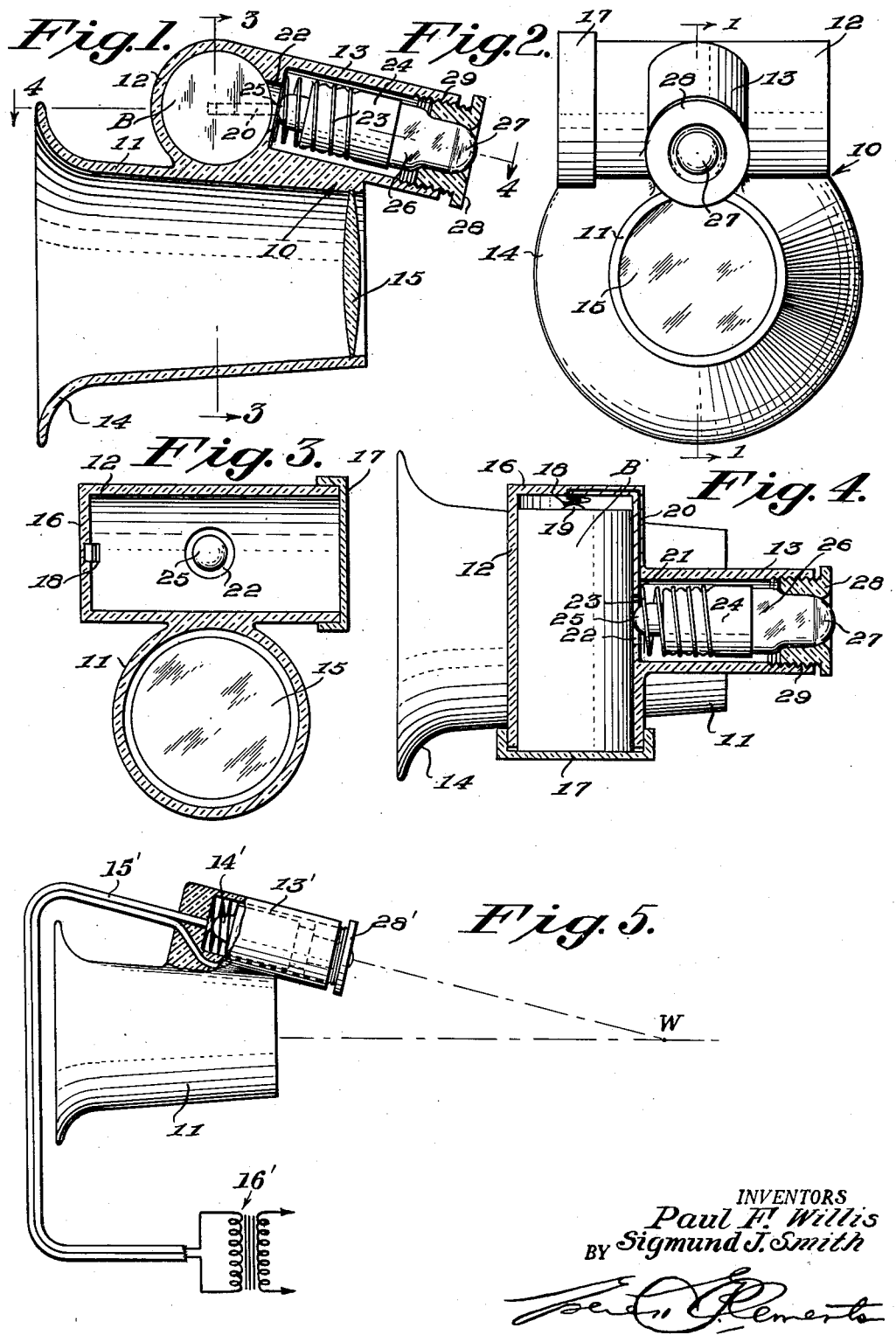

2,503,850

UNITED STATES PATENT OFFICE 2,503,850

COMBINED LOUPE AND ILLUMINATING MEANS

Sigmund J. Smith and Paul F. Willis, Hagerstown, Md.; said Willis assignor to Elvin E. Beard, Hagerstown, Md.

Application July 3, 1947, Serial No. 758,830

1 Claim. (Cl. 88—39)

This invention relates to a magnifying and illuminating device. The invention is more particularly concerned with a monocle or loupe such as is used by jewelers, physicians, bacteriologists, etc. for examination of and operation on minute objects or parts.

While the loupes as now constructed and which embody an elongated eye encircling shell having a magnifying glass therein, are satisfactorily efficient so far as magnification of the objects or parts being examined, are concerned, such objects or parts often are not sufficiently illuminated to render the same clearly visible even though they be substantially magnified.

While it is appreciated that lamps have heretofore been proposed in operative association with magnifying lens, they are not satisfactorily adaptable to loupes which require that the light from the lamp be accurately focused on the object or part under examination.

It is a primary object of this invention to provide a loupe embodying an elongated eye encircling shell having a magnifying glass therein, and a lamp supported by the shell in a manner that the light rays therefrom will be accurately focused on the object or part which is magnified by the lens in the loupe.

A further object of the invention is the provision of a magnifying and illuminating device embodying a unitary casing providing an elongated eye encircling cylindrical shell having a magnifying glass therein for enlargement of objects under examination, and the casing further providing a cylindrical housing surmounting the shell with its axis intersecting that of the shell at the focal point of the lens therein and a lamp supported in the housing for illuminating an object of the said focal point.

A further object of the invention is the provision of a device of the above noted character which is relatively simple in construction, highly dependable in use, and in which the relation between the magnifying lens and the illuminating lamp remains constant whereby it is always in readiness for use.

Other objects and advantages of the invention will become apparent in the course of the following detailed description, taken in connection with the accompanying drawing, wherein—

Fig. 1 is a vertical sectional view in the plane of line 1—1, Fig. 2;

Fig. 2 is a front elevational view of the structure;

Fig. 3 is a vertical sectional view in the plane of line 3—3, Fig. 1;

Fig. 4 is a general horizontal sectional view in the planes of line 4—4, Fig. 1;

Fig. 5 is a side elevational view of a modified form of the structure on a smaller scale than Figs. 1 to 4.

The improved structure embodies a unitary casing 10 which may be molded from magnesium, aluminum, alloy, or plastic material, as indicated on the drawing. The unitary casing 10 includes the frusto-conical shell 11 which as indicated corresponds to that of the usual jeweler's loupe. The casing 10 further includes a cylindrical housing 12 superposed on the shell 11 and whose axis is at right angles to that of the shell. The casing further includes a second cylindrical housing 13 disposed intermediate the ends of housing 12, whose axis is at right angles to that of the housing 12 but which intersects the axis of shell 11, as is indicated particularly in Fig. 5.

The shell 11 includes an outwardly directed curved end portion 14 for engagement with the face of a wearer in circumscribing relation to an eye as is well understood, and the shell is provided with the usual lens 15. The housing 12 includes an integral end portion 16 and a suitable cap 17 is provided for the otherwise open end of the housing, the cap being constructed to frictionally grip the outer wall of the housing. If desired, a threaded connection may be provided between the cap and housing.

A yieldable metallic contact 18 is provided within the end 16 of housing 12 for engagement by the contact member 19 on a dry cell battery B which is snugly received in the housing 12 and retained in contact position by means of the cap 17. The contact 18 is connected by means of a suitable metallic strip or strand 20 with a contact member 21 which circumscribes a circular opening 22 in the wall of housing 12 communicating with the housing 13.

The connecting strip 20 is preferably imbedded or molded in the wall of housing 12 as is indicated in Fig. 4, and the circular contact member 21 is disposed at the base of the housing 13. The housing 13 accommodates a combined lamp and switch structure which comprises a coil spring 23 having several convolutions thereof engaged with the socket member 24 and which is provided with a contact member 25 which is extendable through the opening 22 into contact with the wall of the battery B.

A lamp bulb 26 is carried by the socket member 24 and such bulb preferably includes a light ray concentrating lens 27. A member 28 has a threaded connection 29 with the inner wall of housing 13 for adjustment relative thereto and the member 28 receives the end of bulb 26 in a manner to retain same within the housing, as is clearly indicated in Figs. 1 and 4. The spring 23 urges the bulb outward to a position as limited by member 28 and upon rotation of member 28 the bulb 26, together with the socket member 24 and its contact member 25 may be forced inwardly or permitted to move outwardly under the action of the spring 23.

As is indicated in Fig. 1, member 28 which operates as a switch has been turned outwardly with the result that spring 23 has forced member 24 outwardly therewith, and the contact member 25 has moved out of engagement with the battery B with the result that the circuit through the lamp has been broken. It is to be understood that the cylindrical wall of the battery B is an electrical conductor such that upon rotation of member 28 in the opposite direction with contact member 25 in engagement with the battery, as in Fig. 4, the circuit through the lamp will be closed. The spring 23 remains in engagement with the contact member 21 when the circuit is broken, as in Fig. 1, as well as when the circuit is closed, as in Fig. 4, and it is accordingly necessary only to impart a slight turn to member 28 to open or close the circuit.

The operation of the device is schematically illustrated in Fig. 5 wherein the work W is being examined through the casing 10, and the angle between the axes of shell 11 and housing 13 is such that the light rays are focused by the lamp lens 27 on the work which is at the focal point of the lens 15. While the lens 15 is disclosed as being fixed, it is readily removable for substitution of other lenses therefor.

Due to the arrangement of the lamp relative to the loupe, objects being magnified by the lens 15 are accurately illuminated by the lamp and since the axes of the shell 11 and housing 13 remain relatively fixed, the light rays accurately play on the object being magnified irrespective of movements of the head of a person wearing the loupe.

In the embodiment of Fig. 5, the unitary casing structure is essentially the same as in the other figures, but in place of a transverse cylindrical battery chamber on the shell 11, the straight cylindrical lamp housing 13' is merely closed at its rear end by a lamp socket base 14' from which lead lines or wires 15' may be connected to a separate source of electric current, such as a transformer, batteries, etc. indicated at 16'. An adjustable ring member 28' serves to longitudinally adjust the lamp within the housing, as above described.

The device will find particular adaptation for use by jewelers, physicians, bacteriologists, or any one engaged in examination of or operation on minute objects which are secluded in normally poorly illuminated places.

While we have disclosed our invention in accordance with a single specific embodiment thereof, such is to be considered as illustrative only, and not restrictive, the scope of the invention being defined in the subjoined claim.

We claim:

A magnifying and illuminating device comprising a unitary molded casing providing a frusto-conical shell having a lens at one end thereof, a cylindrical housing structurally integral with and immovably mounted on the shell forming a longitudinal radial rib-like extension along one side of the shell and projecting beyond the lens carrying end of the shell, the extended longitudinal axis of the housing and the longitudinal axis of the shell when extended beyond the lens end of the shell intersecting at the focal point of the lens, said housing having electric contacts therein and a lamp for engagement with said contacts, and means for supporting and axially moving the lamp relative to said contacts within the housing and constituting switch means for said lamp.

SIGMUND J. SMITH.
PAUL F. WILLIS.

REFERENCES CITED

The following references are of record in the file of this patent:

UNITED STATES PATENTS

| Number | Name | Date |
| --- | --- | --- |
| 1,556,510 | King | Oct. 6, 1925 |
| 2,164,148 | Swanson | June 27, 1939 |
| 2,285,987 | Krimsky | June 9, 1942 |

FOREIGN PATENTS

| Number | Country | Date |
| --- | --- | --- |
| 484,676 | Great Britain | May 6, 1938 |
| 218,411 | Switzerland | Mar. 16, 1942 |